United States Patent
Sun et al.

(10) Patent No.: US 11,482,820 B2
(45) Date of Patent: Oct. 25, 2022

(54) CHARGING APPARATUS

(71) Applicant: Shenzhen Hello Tech Energy Co., LTD., Shenzhen (CN)

(72) Inventors: Zhongwei Sun, Shenzhen (CN); Shaokui Huang, Shenzhen (CN)

(73) Assignee: SHENZHEN HELLO TECH ENERGY CO., LTD., Shenzhen (CN)

( * ) Notice: Subject to any disclaimer, the term of this patent is extended or adjusted under 35 U.S.C. 154(b) by 443 days.

(21) Appl. No.: 16/724,146

(22) Filed: Dec. 20, 2019

(65) Prior Publication Data
US 2020/0343677 A1 Oct. 29, 2020

(30) Foreign Application Priority Data

Apr. 23, 2019 (CN) .......................... 201910328699.7

(51) Int. Cl.
| | |
|---|---|
| H01R 24/58 | (2011.01) |
| B60L 1/00 | (2006.01) |
| B60N 3/14 | (2006.01) |
| B60R 16/03 | (2006.01) |
| H01R 11/24 | (2006.01) |
| H01R 13/68 | (2011.01) |
| H02J 7/00 | (2006.01) |
| H02J 7/14 | (2006.01) |
| B60R 11/00 | (2006.01) |

(52) U.S. Cl.
CPC .............. *H01R 24/58* (2013.01); *B60L 1/006* (2013.01); *B60N 3/14* (2013.01); *B60R 16/03* (2013.01); *H01R 11/24* (2013.01); *H01R 13/68* (2013.01); *H02J 7/007* (2013.01); *H02J 7/14* (2013.01); *B60R 2011/0054* (2013.01)

(58) Field of Classification Search
CPC ........ H01R 24/58; H01R 11/24; H01R 13/68; B60L 1/006; B60N 3/14; B60R 16/03; B60R 2011/0054; H02J 7/007; H02J 7/14
See application file for complete search history.

(56) References Cited

U.S. PATENT DOCUMENTS

| | | | |
|---|---|---|---|
| 6,380,712 B2 * | 4/2002 | Murphy ................ | H02J 7/0069 320/107 |
| 2005/0258797 A1 * | 11/2005 | Hung ..................... | H02J 7/342 320/105 |
| 2014/0159509 A1 * | 6/2014 | Inskeep .................. | H02J 7/342 307/150 |

* cited by examiner

*Primary Examiner* — Carlos Amaya

(57) ABSTRACT

The present disclosure discloses a charging apparatus. The charging apparatus comprises a power source module, a main control circuit, a voltage booster circuit, an adjusting circuit, and an output port. The charging apparatus is configured to charge a vehicle battery or other consumers through the output port. The power source module is electrically connected to the main control circuit and the voltage booster circuit. The main control circuit is electrically connected to the adjusting circuit and the voltage booster circuit. The main control circuit is configured to output an adjusting signal to the adjusting circuit. The adjusting circuit controls the voltage booster circuit to output a first or second output voltage to the output port, according to the adjusting signal. The second output voltage is greater than the first output voltage. The present disclosure provides a plurality of voltages to meet the vehicle battery.

10 Claims, 4 Drawing Sheets

CHARGING APPARATUS

CROSS REFERENCE TO RELATED APPLICATIONS

This non-provisional patent application claims the benefit of Chinese Patent Application No. 201910328699.7 filed on 23 April. The above is hereby incorporated by reference.

TECHNICAL FIELD

The present disclosure relates to an electronic device, in particular to a charging apparatus.

BACKGROUND

Nowadays, cars have spread to all households. The present cars, even if these cars are energy cars, it will still need a battery. The car needs to a battery for charging the car when to provide electrical energy is started, the car's starting system is powered. Vehicle starter by power supply, spark plug ignition, gasoline pump operation, EH system and other equipment need to be powered by the battery during the ignition start of the engine. The present batteries are generally lead-acid batteries. The lead-acid batteries have a large capacity, generally greater than 35 Ah. But the present emergency batteries are designed to charge the vehicle battery while charging the vehicle equipment. Generally, only one output voltage is provided for the vehicle equipment. However, the output voltage of the in-vehicle device is too low for the output voltage of the lead-acid battery, and the vehicle battery cannot be quickly charged from the power-off state to the start-up state to realize emergency charging.

SUMMARY

The present disclosure provides a charging apparatus to provide a corresponding charging voltage suitable for consumers.

The objective of the present disclosure is achieved by the following technical solutions:

A charging apparatus comprises a main control circuit, a voltage booster circuit electrically connected to the main control circuit, a power source module electrically connected to the main control circuit and the voltage booster circuit, an adjusting circuit, and an output port; the charging apparatus is configured to charge a vehicle battery or other consumers through the output port; the main control circuit is configured to output an adjusting signal to the adjusting circuit; the adjusting circuit is configured to control the voltage booster circuit to output a first or second output voltage to the output port, according to the adjusting signal; the second output voltage is greater than the first output voltage.

Preferably, the charging apparatus further comprises a detection circuit, the detection circuit is electrically connected to the main control circuit, the detection circuit is configured to detect the output port to determine whether the output port is electrically connected to the vehicle battery; when the output port is electrically connected to the vehicle battery, the detection circuit generates a detection signal; when the main control circuit detects the detection signal, the main control circuit sends an adjusting signal to the adjusting circuit, the adjusting circuit controls the voltage booster circuit to output a second output voltage according to the adjusting signal.

Preferably, the detection circuit comprises a first detection resistance, a second detection resistance, and a detection node electrically connected between the first detection resistance and the second detection resistance, the detection node is electrically connected to the main control circuit, the first detection resistance is electrically connected to the output port, the second detection resistance is grounded, the main control circuit is further configured to detect whether the detection node generates the detection signal when the voltage booster circuit is powered off.

Preferably, the adjusting signal comprises a first adjusting signal, the adjusting circuit controls the voltage booster circuit to output the second output voltage according to the first adjusting signal; the charging apparatus further comprises a mode selection switch, the mode selection switch is configured to provides charging modes for users to charge the charging apparatus, the charging modes comprise an auto adjustment mode and a shortcut mode, when the shortcut mode is selected by a user, the main control circuit sends the first adjusting signal to the adjusting circuit; when the auto adjustment mode is selected, the voltage booster circuit is powered by the main control circuit.

Preferably, wherein the auto adjustment mode is selected, the voltage booster circuit is powered off by the main control circuit.

Preferably, the adjusting signal comprises a first adjusting signal and a second adjusting signal, the adjusting circuit comprises an electronic switch, a first feedback resistance, a second feedback resistance, a third feedback resistance, and a feedback node; the feedback node is electrically connected between the first feedback resistance and the second feedback resistance, the electronic switch is electrically connected between the third feedback resistance and the main control circuit, one terminal of the first feedback resistance is electrically connected to the output port, the other terminal of the first feedback resistance is electrically connected to the feedback node, one terminal of the second feedback resistance is electrically connected to the feedback node, the other terminal of the second feedback resistance is grounded, one terminal of the third feedback resistance is electrically connected to the feedback node, the other terminal of the third feedback resistance is electrically connected to the electronic switch; the voltage booster circuit is further electrically connected to the feedback node; when the main control circuit outputs the first adjusting signal, the electronic switch is turned on; when the main control circuit outputs the second adjusting signal, the electronic switch is turned off.

Preferably, the electronic switch is a Field Effect Transistor (FET), a gate of the FET is electrically connected to a pin of the main control circuit, a drain of the FET is electrically connected to one terminal of the third feedback resistance, and a source of the FET is grounded.

Preferably, the voltage booster circuit is configured to detect a voltage of the feedback node and change an output voltage according to the voltage of the feedback node.

Preferably, the charging apparatus further comprises a power supply wire, one terminal of the power supply wire provides a cigar-lighter plug electrically connected to the output port, the cigar-lighter plug comprises an anode trigger point and a cathode trigger point, the anode trigger point and the cathode trigger point latch an anode and a cathode of the output port, respectively, to steady the electrical connection between the cigar-lighter plug and the output port; another terminal of the power supply wire is provided an alligator clip, the alligator clip is configured to be electrically connected to the vehicle battery or other consumers to transfer electrical energy.

Preferably, the main control circuit is further electrically connected to a temperature detection circuit, the temperature detection circuit comprises a thermistance, and two terminals of the thermistance is electrically connected to the main control circuit and is grounded, respectively.

Compared with the prior art, the charging apparatus of the present disclosures provides a plurality voltages for charging a vehicle battery or other consumers; the charging apparatus can select a corresponding voltage to charge the vehicle battery or other consumers; in addition, the temperature detection circuit is used to ensure electricity safety.

DETAILED DESCRIPTION OF THE PREFERRED EMBODIMENTS

Below, embodiments of the present invention will be described in greater detail with reference to the drawings. It should be noted that the embodiment are illustrative rather than limiting the scope of the present invention.

It should be noted that, if not conflicting, each feature in the embodiments of the present invention may be combined with each other, and are all within the protection scope of the present invention. In addition, although the functional modules is divided in the schematic view of the apparatus and the logical sequence is shown in the flowchart, in some other cases, the functional modules can be deviled in a different manner and the steps can be performed in a different logical sequence.

Figure 1:
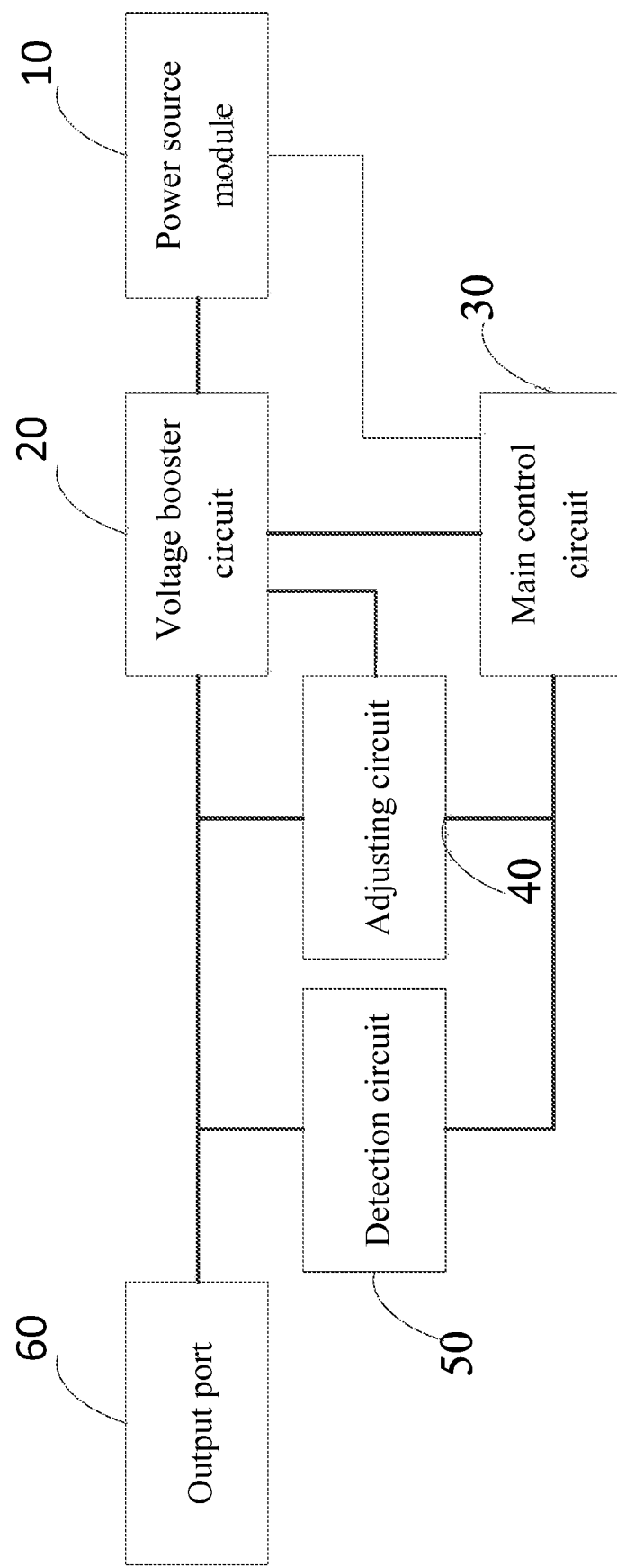
FIG. 1 is a block diagram of one exemplary embodiment of a charging apparatus.

The present disclosure provides a charging apparatus configured to charge a vehicle battery or other consumers. The charging apparatus comprises a power supply for storing electric energy and providing vehicles with the storing electric energy. FIG. 1 illustrates that the charging apparatus comprises a power source module 10, a main control circuit 30, a voltage booster circuit 20, an adjusting circuit 40, and an output port 60. The charging apparatus is configured to be secured to a vehicle battery or other consumers through the output port 60. The charging apparatus is also configured to output one output voltage for charging the vehicle battery through the output port 60. The main control circuit 30 is configured to control the adjusting circuit 40 to output an output voltage suitable for the vehicle battery to reduce charging time and make the vehicle battery return to work as soon as possible.

The power source module 10 is electrically connected to the main control circuit 30 and the voltage booster circuit 20. The power source module 10 is configured to provide electric energy for the main control circuit 30 and the voltage booster circuit 20. The voltage booster circuit 20 is configured to change a voltage provided through the power source module 10 and output the changed voltage to the output port 60. The main control circuit 30 is electrically connected to the adjusting circuit 40 and the voltage booster circuit 20. The main control circuit 30 is configured to output an adjusting signal to the adjusting circuit 40. The adjusting circuit 40 is configured to control the voltage booster circuit 20 to output a first the output voltage or a second the output voltage to the output port 60 according to the adjusting signal. In at least one exemplary embodiment, the second output voltage is greater than the first output voltage, the first output voltage is a voltage required for charging other consumers, and the second output voltage is a voltage required for charging the vehicle battery. Specifically, a value of the first output voltage is 12V and a value of the second output voltage is 14.5V. Specifically, the power source module 10 is a lithium battery or another battery module.

Preferably, the charging apparatus further comprises a detection circuit 50. The detection circuit 50 is electrically connected to the main control circuit 30 and the output port 60. The detection circuit 50 is configured to detect the output port 60 to determine whether the output port 60 is electrically connected to the vehicle battery, to output the first output voltage or the second output voltage. When the output port 60 is electrically connected to the vehicle battery, the detection circuit 50 generates a detection signal. When the main control circuit 30 sends the first adjusting signal to the adjusting circuit 40 when detecting the detection signal, and then the adjusting circuit 40 controls the voltage booster circuit 20 to output the second output voltage according to the first adjusting signal.

Figure 2:
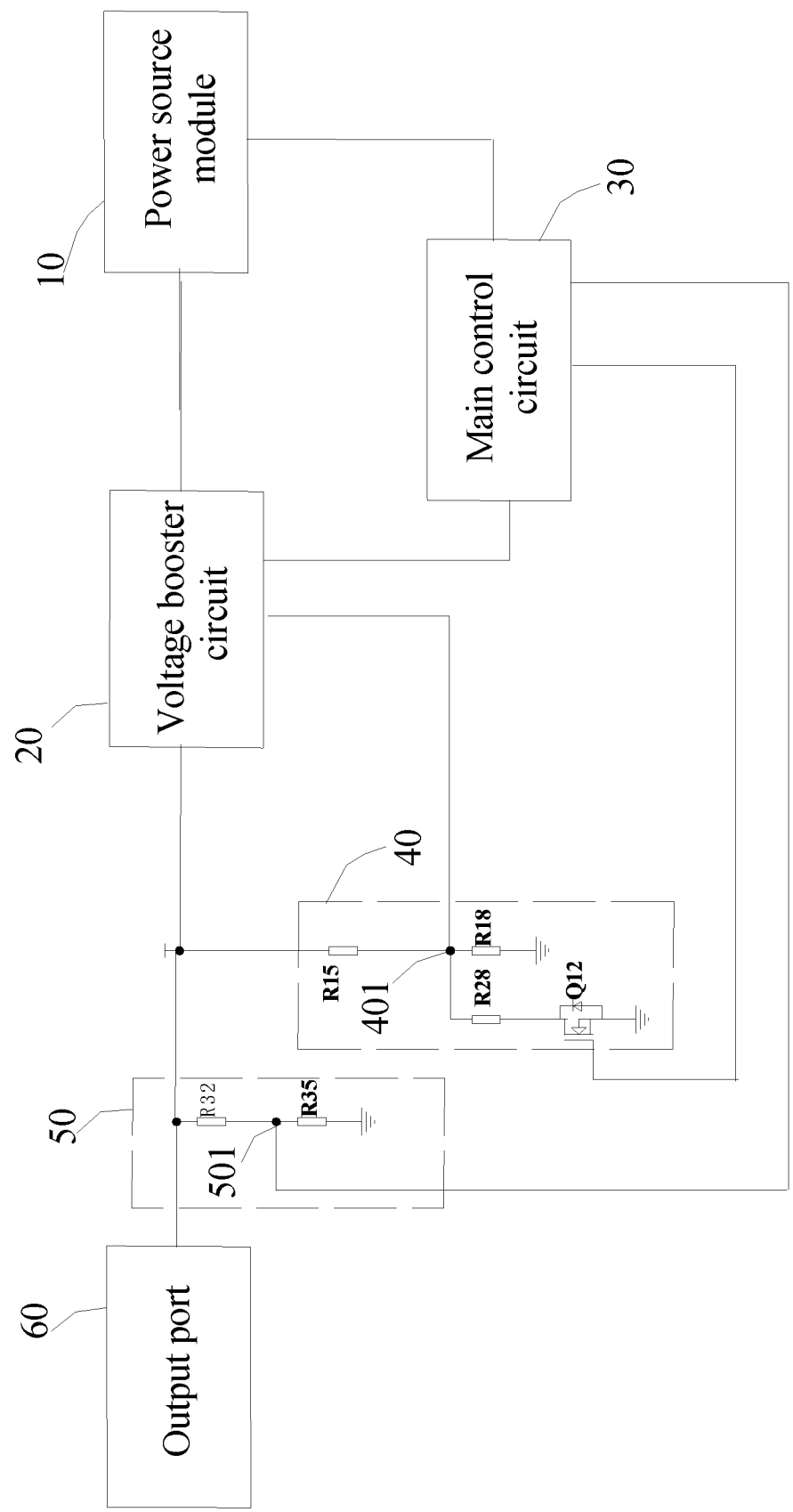
FIG. 2 is a circuit diagram of the charging apparatus of FIG. 1.
Figure 3:
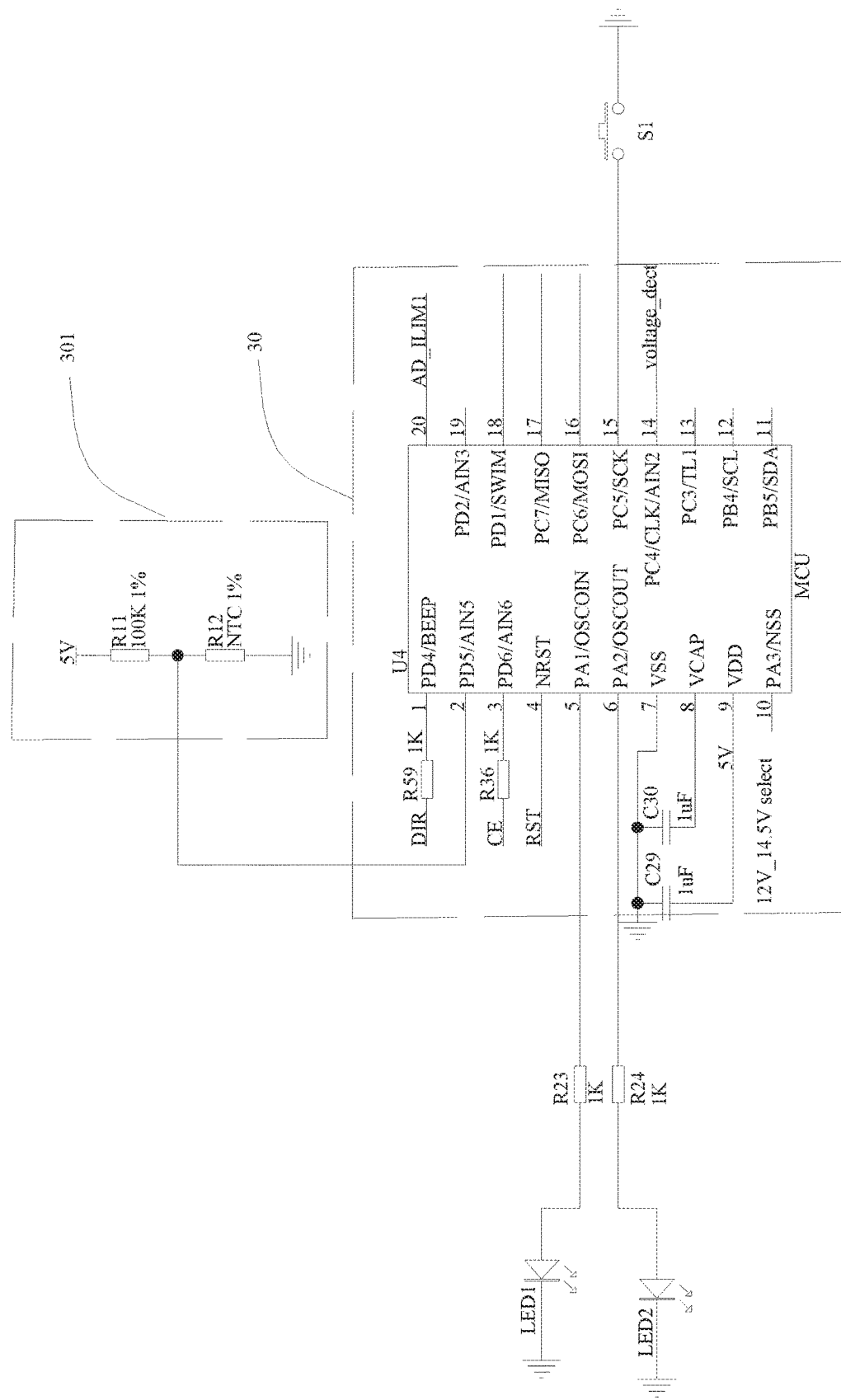
FIG. 3 is a circuit diagram of a main control circuit of the charging apparatus of FIG. 2.

Preferably, FIGS. 2-3 illustrate that the detection circuit 50 comprises a first detection resistance R32, a second detection resistance R35, and a detection node 501 electrically connected between the first detection resistance R32 and the second detection resistance R35. The detection node 501 is electrically connected to the main control circuit 30. One terminal of the first detection resistance R32 is electrically connected to the output port 60. One terminal of the second detection resistance R35 is electrically connected to the first detection resistance R32, the other terminal of the second detection resistance R35 is grounded. The main control circuit 30 is further configured to detect the detection node 501 to determine whether the detection signal exists, and determine whether the output port 60 is electrically connected to the vehicle battery, when the voltage booster circuit 20 is powered off.

In at least one exemplary embodiment, the adjusting signal comprises a first adjusting signal and a second adjusting signal. The charging apparatus further comprises a mode selection switch S1. The mode selection switch S1 is electrically connected to the main control circuit 30. The mode selection switch S1 provides charging modes for users to charge the charging apparatus. In at least one exemplary embodiment, the charging modes comprise an auto adjustment mode and a shortcut mode. When the shortcut mode is selected by a user, the main control circuit 30 sends the first adjusting signal to the adjusting circuit 40. When the auto adjustment mode is selected, the voltage booster circuit is powered by the main control circuit.

The adjusting circuit 40 comprises an electronic switch Q12, a first feedback resistance R15, a second feedback resistance R18, a third feedback resistance R28, and a feedback node 401. The feedback node 401 is electrically connected between the first feedback resistance R15 and the second feedback resistance R18. The electronic switch Q12 is electrically connected between the third feedback resistance R28 and the main control circuit 30. One terminal of the first feedback resistance R15 is electrically connected to the output port 60, the other terminal of the first feedback resistance R15 is electrically connected to the feedback node 401. One terminal of the second feedback resistance R18 is electrically connected to the feedback node 401, the other terminal of the second feedback resistance R18 is grounded. One terminal of the third feedback resistance R28 is electrically connected to the feedback node 401, the other terminal of the third feedback resistance R28 is electrically connected to the electronic switch Q12. The voltage booster circuit 20 is further electrically connected to the feedback node 401. When the main control circuit 30 outputs the first adjusting signal, the electronic switch Q12 is turned on. When the main control circuit 30 outputs the second adjusting signal, the electronic switch Q12 is turned off. Preferably, the electronic switch Q12 is a Field Effect Transistor (FET). A gate of the FET is electrically connected to a pin 10 of the main control circuit 30, a drain of the FET Q12 is electrically connected to one terminal of the third feedback resistance R28, and a source of the FET is grounded.

In at least one exemplary embodiment, the voltage booster circuit 20 is configured to detect a voltage of the feedback node 401, and is configured to change the voltage of the feedback node 401, such as increase or decrease the voltage of the feedback node 401. Specifically, in the exemplary embodiment, the voltage booster circuit 20 comprises a pulse width modulation (PWM) power supply controller U1. The adjusting circuit 40 is configured to collect the voltage of the output port 60. The adjusting circuit 40 is also configured to feed back the collected voltage to a FB (feedback) port (not shown) of the PWM power supply controller through the feedback node 401 after collect the voltage of the output port 60. The PWM power supply controller is configured to control the output voltage of the voltage booster circuit 20. The PWM power supply controller of the voltage booster circuit 20 is configured to detect a voltage of the feedback node 401, to obtain the sampling of the first feedback resistance R15 and the second feedback resistance R18, and to determine whether the voltage of the feedback node 401 reaches a predetermined voltage; if the feedback node 401 reaches the predetermined voltage, the voltage booster circuit 20 remains the same output voltage and continuously outputs the output voltage to the output port 60. In the present exemplary embodiment, a style of the PWM power supply controller is SC8802.

In at least one exemplary embodiment, the main control circuit 30 sends the first adjusting signal to a FET Q12, then the FET Q12 controls the third feedback resistance R28 to be grounded when receiving the first adjusting signal, thus the third feedback resistance R28 is connected in parallel with the second feedback resistance R18, thereby enabling to reduce the voltage of the feedback node 401, the voltage booster circuit 20 does not detect the voltage of the feedback node 401 to reach a predetermined voltage when the voltage of the feedback node 401 is reduced, the voltage booster circuit 20 adjusting signal to adjust the voltage of the feedback node 401, until the voltage of the feedback node 401 reaches the predetermined voltage. Thus the feedback node 401 reaches the predetermined voltage and the voltage of the output port 60 reaches the second output voltage.

Specifically, when the auto adjustment mode is selected by the user, the voltage booster circuit is powered by the main control circuit, and the voltage booster circuit 20 adjusts the output voltage of the power source module 10 to be equal to the first output voltage. When the voltage booster circuit 20 detects the output voltage of the output port 60 to reach the first output voltage, an output current of the output port 60 is reduced slowly reduced, the output voltage is powered off and be delayed a few seconds, the detection circuit 50 detects whether the output port 60 generates the voltage, if yes, the detection circuit 50 determines the output port 60 to be electrically connected the vehicle battery, and generates the detection signal and sends the detection signal to the main control circuit 30, the main control circuit 30 outputs the first adjusting signal to the FET Q12 when receiving the detection signal, the FET Q12 is powered on when receiving the first adjusting signal, thereby enabling the third feedback resistance R28 to be grounded and is connected in parallel with the second feedback resistance R18; thus the voltage booster circuit 20 detects sample variation, adjusts the output voltage, and outputs the second output voltage. When the shortcut mode is selected by the user, the main control circuit 30 directly sends the first adjusting signal to the adjusting circuit 40, to enable the voltage booster circuit 20 to continuously output the second output voltage. When the auto adjustment mode is selected by the user, the voltage booster circuit 20 is powered of by the main control circuit 30.

In at least one exemplary embodiment, the charging apparatus further comprises a temperature detection circuit, the temperature detection circuit is electrically connected to the main control unit 30, the temperature detection circuit comprises a thermistance R12 connected to a pin 2 of the main control unit 30. When a temperature (such as the temperature of thermistance R12) is detected to be too high, the main control unit 30 sends an electrical signal to the voltage booster circuit 20 in time, to stop outputting electrical energy to ensure electricity safety.

In at least one exemplary embodiment, the main control circuit 30 comprises a control chip U4. In the present exemplary embodiment, the control chip U4 is a microcontroller Unit. A pin 1 and a pin 3 of the control chip U4 of the main control circuit 30 are electrically connected to a pin DIR (not shown) and a pin CE (not shown) of the PWM power supply controller, respectively. Specifically, the main control circuit 30 determines that the mode selection switch S1 to be triggered to be the auto adjustment mode, the main control circuit 30 sends electric signals to power on the PWM power supply controller as follows: the pin 3 of the control chip U4 of the main control circuit 30 sends a first low level signal to the pin CE of the PWM power supply controller, the pin 1 of the control chip U4 of the main control circuit 30 sends a second high level signal to the pin DIR of the PWM power supply controller, in at least one exemplary embodiment, the electric signals comprises the first low level signal and the second high level signal. The PWM power supply controller receives the first low level signal and the second high level signal, the voltage booster circuit 20 controls to increase the voltage output by the power source module 10, the detection circuit 50 detects the output voltage output by the power source module 10. When the output voltage output by the power source module 10 is less than 12V, an output current output by the power source module 10 is constant and the output voltage output by the power source module 10 is increased slowly through the voltage booster circuit 20. When the output voltage output by the power source module 10 is near 12V, the output current output by the power source module 10 is reduced slowly, when the detection circuit 50 detects the output voltage reaches 12V, the output current output by the power source module 10 is reduced quickly, the output voltage is powered off and is delayed in several seconds. When the detection circuit 50 detects the voltage to be output by the output port 60, the charging apparatus is charging the vehicle battery, the main control circuit 30 provides a high level voltage 5V for the FET Q12 with 5V, to enable the third feedback resistance R28 to be grounded, the output voltage is continuously increased to be 14.5V. When the detection circuit 50 does not detect the voltage output by the output port 60, the charging apparatus is charging the consumers, the output voltage stops being increased. In at least one exemplary embodiment, a pin 20 of the control chip U4 of the main control circuit 30 is electrically connected to a pin ITIM (not shown) of the PWM power supply controller, to determine whether the output current output by the power source module 10 is constant; when output current output by the power source module 10 is too heavy, it is necessary to take overcurrent protection in time. When the main control circuit 30 detects that the mode selection switch S1 is triggered to power on the shortcut mode, the main control circuit 30 sends the electronic signals to the voltage booster circuit 20 to power on the voltage booster circuit 20, and sends the first adjusting signal to the FET Q12 to control the voltage booster circuit 20 to output the output voltage 14.5V. Compared with the auto adjustment mode, the output voltage output through the shortcut mode the voltage is more stable and charges faster. The main control circuit 30 further comprises a LED1 and a LED2, when the auto adjustment mode is selected, the LED1 is lighted; and when the shortcut mode is selected, the LED2 is lighted.

Figure 4:
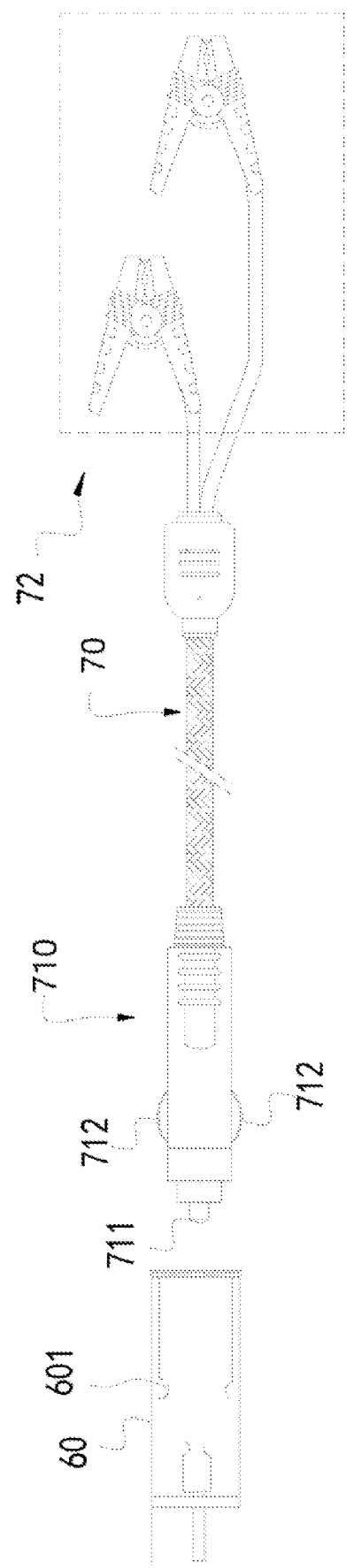
FIG. 4 is a circuit diagram of a power supply wire of the charging apparatus of FIG. 2.

In at least one exemplary embodiment, the charging apparatus further comprises a power supply wire 70. FIG. 4 illustrates a circuit diagram of the power supply wire 70 of the charging apparatus. The power supply wire 70 is inserted into the output port 60 to be fixed to the output port 60. The power supply wire 70 is configured to output a current voltage of the charging apparatus when the charging apparatus is boosted or stepped down. The power supply wire 70 and the output port 60 is electrically connected to a plug 710. The plug 710 is a cigar-lighter plug. In the present exemplary embodiment, the output port 60 is a port suitable for the cigar-lighter plug 710. The cigar-lighter plug 710 comprises an anode trigger point 711 and at least one cathode trigger point 712. The anode trigger point 711 is placed at a tail end of the cigar-lighter plug 710. The cigar-lighter plug 710 comprises two cathode trigger points 712, the two cathode trigger points 712 are placed at two opposite sides of the cigar-lighter plug 710, respectively. Each of the anode trigger point 711 and the two cathode trigger points 712 is a protruding metal contact, the protruding metal contact is engaged with the metal spring clip 601 of the output port 60, to make the connection between the plug 710 and the output port 60 more stable. The cigar-lighter plug 710 comprises a fuse with 15 A (a maximum current is 15 A), the fuse with 15A is used to protect the vehicle battery when the voltage output by the output port 60 is abnormal. The power supply wire 70 comprises two alligator clips 72, the two alligator clips 72 are configured to be electrically connected to the vehicle battery or other consumers.

A plurality of voltages provided by the present exemplary embodiment are charging the corresponding vehicle battery. The charging apparatus of the present exemplary embodiment can provide one corresponding voltage suitable for the vehicle battery when detects the vehicle battery. The voltage booster circuit controls the charging apparatus to output constant voltage and current for charging the vehicle battery or consumers through the PWM power supply controller, to avoid the heavy current generated by a battery when the battery is powered on. In addition, the temperature detection circuit is used to ensure electricity safety.

The above embodiments are only the preferred embodiments of the present invention, and do not limit the scope of the present invention. A person skilled in the art may make various other corresponding changes and deformations based on the described technical solutions and concepts. And all such changes and deformations shall also fall within the scope of the present invention.

What is claimed is:

1. A charging apparatus for charging comprising:
   a main control circuit;
   a voltage booster circuit electrically connected to the main control circuit;
   a power source module electrically connected to the main control circuit and the voltage booster circuit;
   an adjusting circuit; and
   an output port;
   wherein charging apparatus is configured to charge a vehicle battery through the output port; the main control circuit is configured to output an adjusting signal to the adjusting circuit; the adjusting circuit is configured to control the voltage booster circuit to output a first or second output voltage to the output port, according to the adjusting signal; the second output voltage is greater than the first output voltage;
   wherein the adjusting signal comprises a first adjusting signal, the adjusting circuit controls the voltage booster circuit to output the second output voltage according to the first adjusting signal; the charging apparatus further comprises a mode selection switch, the mode selection switch is configured to provide charging modes for users to charge the charging apparatus, the charging modes comprise an auto adjustment mode and a shortcut mode, when the shortcut mode is selected by a user, the main control circuit sends the first adjusting signal to the adjusting circuit; when the auto adjustment mode is selected, the voltage booster circuit is powered by the main control circuit.

2. The charging apparatus according to claim 1, wherein the charging apparatus further comprises a detection circuit, the detection circuit is electrically connected to the main control circuit, the detection circuit is configured to detect the output port to determine whether the output port is electrically connected to the vehicle battery; when the output port is electrically connected to the vehicle battery, the detection circuit generates a detection signal; when the main control circuit detects the detection signal, the main control circuit sends an adjusting signal to the adjusting circuit, the adjusting circuit controls the voltage booster circuit to output a second output voltage according to the adjusting signal.

3. The charging apparatus according to claim 2, wherein the detection circuit comprises a first detection resistance, a second detection resistance, and a detection node electrically connected between the first detection resistance and the second detection resistance, the detection node is electrically connected to the main control circuit, the first detection resistance is electrically connected to the output port, the second detection resistance is grounded, the main control circuit is further configured to detect whether the detection node generates the detection signal when the voltage booster circuit is powered off.

4. The charging apparatus according to claim 1, wherein when the auto adjustment mode is selected, the voltage booster circuit is powered off by the main control circuit.

5. The charging apparatus according to claim 1, wherein the adjusting signal comprises a first adjusting signal and a second adjusting signal, the adjusting circuit comprises an electronic switch, a first feedback resistance, a second feedback resistance, a third feedback resistance, and a feedback node; the feedback node is electrically connected between the first feedback resistance and the second feedback resistance, the electronic switch is electrically connected between the third feedback resistance and the main control circuit, one terminal of the first feedback resistance is electrically connected to the output port, the other terminal of the first feedback resistance is electrically connected to the feedback node, one terminal of the second feedback resistance is electrically connected to the feedback node, the other terminal of the second feedback resistance is grounded, one terminal of the third feedback resistance is electrically connected to the feedback node, the other terminal of the third feedback resistance is electrically connected to the electronic switch; the voltage booster circuit is further electrically connected to the feedback node; when the main control circuit outputs the first adjusting signal, the electronic switch is turned on; when the main control circuit outputs the second adjusting signal, the electronic switch is turned off.

6. The charging apparatus according to claim 5, wherein the electronic switch is a Field Effect Transistor (FET), a gate of the FET is electrically connected to a pin of the main control circuit, a drain of the FET is electrically connected to one terminal of the third feedback resistance, and a source of the FET is grounded.

7. The charging apparatus according to claim 5, wherein the voltage booster circuit is configured to detect a voltage of the feedback node and change an output voltage according to the voltage of the feedback node.

8. The charging apparatus according to claim 1, wherein the charging apparatus further comprises a power supply wire, one terminal of the power supply wire provides a cigar-lighter plug electrically connected to the output port, the cigar-lighter plug comprises an anode trigger point and a cathode trigger point, the anode trigger point and the cathode trigger point latch an anode and a cathode of the output port, respectively, to steady the electrical connection between the cigar-lighter plug and the output port; another terminal of the power supply wire is provided an alligator clip, the alligator clip is configured to be electrically connected to the vehicle battery or other consumers to transfer electrical energy.

9. The charging apparatus according to claim 1, wherein the main control circuit is further electrically connected to a temperature detection circuit, the temperature detection circuit comprises a thermistance, and two terminals of the thermistance is electrically connected to the main control circuit and is grounded, respectively.

10. A charging apparatus for charging comprising:
a main control circuit;
a voltage booster circuit electrically connected to the main control circuit;
a power source module electrically connected to the main control circuit and the voltage booster circuit;
an adjusting circuit; and
an output port;
wherein charging apparatus is configured to charge a vehicle battery through the output port; the main control circuit is configured to output an adjusting signal to the adjusting circuit; the adjusting circuit is configured to control the voltage booster circuit to output a first or second output voltage to the output port, according to the adjusting signal; the second output voltage is greater than the first output voltage;
wherein the adjusting signal comprises a first adjusting signal and a second adjusting signal, the adjusting circuit comprises an electronic switch, a first feedback resistance, a second feedback resistance, a third feedback resistance, and a feedback node; the feedback node is electrically connected between the first feedback resistance and the second feedback resistance, the electronic switch is electrically connected between the third feedback resistance and the main control circuit, one terminal of the first feedback resistance is electrically connected to the output port, the other terminal of the first feedback resistance is electrically connected to the feedback node, one terminal of the second feedback resistance is electrically connected to the feedback node, the other terminal of the second feedback resistance is grounded, one terminal of the third feedback resistance is electrically connected to the feedback node, the other terminal of the third feedback resistance is electrically connected to the electronic switch; the voltage booster circuit is further electrically connected to the feedback node; when the main control circuit outputs the first adjusting signal, the electronic switch is turned on; when the main control circuit outputs the second adjusting signal, the electronic switch is turned off.

* * * * *